United States Patent [19]

Palm

[11] Patent Number: 4,639,170

[45] Date of Patent: Jan. 27, 1987

[54] MAGNETIC BASE FOR PORTABLE TOOLS

[75] Inventor: Bernhard Palm, Brookfield, Wis.

[73] Assignee: Milwaukee Electric Tool Corporation, Milwaukee, Wis.

[21] Appl. No.: 720,899

[22] Filed: Apr. 8, 1985

[51] Int. Cl.[4] .......... B23B 45/14

[52] U.S. Cl. .......... 408/76; 279/1 M; 408/710; 408/712

[58] Field of Search .......... 408/76, 135, 4, 5, 6, 408/7, 9, 13, 710, 712; 279/1 M; 269/8

[56] References Cited

U.S. PATENT DOCUMENTS

| | | | |
|---|---|---|---|
| 3,010,054 | 11/1961 | Goldsmith | 269/8 X |
| 3,237,789 | 1/1966 | Engelsted | 269/8 X |
| 4,012,162 | 3/1977 | Warren | 408/76 |
| 4,261,673 | 4/1981 | Hougen | 408/135 X |
| 4,278,371 | 7/1981 | Meyer | 408/76 |
| 4,408,752 | 10/1983 | Uchikune et al. | 269/8 |
| 4,462,726 | 7/1984 | Silvey et al. | 408/76 |
| 4,541,759 | 9/1985 | Miyoshi | 408/76 |
| 4,591,301 | 5/1986 | Pelfrey | 408/135 X |

*Primary Examiner*—Gil Weidenfeld
*Assistant Examiner*—Glenn L. Webb
*Attorney, Agent, or Firm*—Bayard H. Michael

[57] ABSTRACT

The power tool has a magnetic base with superposed permanent magnet assemblies. The upper assembly can be moved relative to the lower assembly to subtract from or reinforce the magnetic field. The upper assembly is somewhat shorter than the lower assembly so even when the upper assembly is positioned to shunt to subtract from the flux of the lower assembly there will be some magnetic flux attracting the base to a ferromagnetic material. When the sensing probe is pushed into the base the electric motor can be switched on to rotate a spindle on which a rotary cutting tool is axially mounted. The tool feed is controlled by a handle which can be mounted on either side of the tool housing.

8 Claims, 5 Drawing Figures

MAGNETIC BASE FOR PORTABLE TOOLS

BACKGROUND OF THE INVENTION

There are portable drill stands having an electromagnetic base enabling the stand to be secured to a ferromagnetic plate or the like. The plate must have substantial thickness to have enough iron in the magnetic field to develop adequate holding power. Such tools involve elaborate safety interlocks to prevent use and dropping of the tool when power fails, etc. The tools cannot be used on relatively thin materials such as the sheet metal used in shelves, cabinets, ducts, etc. Such drill presses can be difficult or impossible to use in drilling a hole in an overhead member.

This invention is directed to provide a permanent magnet base for portable power tools.

SUMMARY OF THE INVENTION

This invention provides a portable tool having a permanent magnet base for holding the tool on ferromagnetic material. The area of the permanent magnet field is substantial with the result that the holding power is great and can hold a rather heavy tool on relatively thin sheet metal and the like.

The invention provides means for rendering the permanent magnet field substantially ineffective to permit the machine to be moved easily. This is accomplished by providing a number of magnetic shunts actuated by handle means used in lifting the machine. The shunt is not complete so there is some magnetic flux at all times. This results in a small but helpful magnetic force facilitating handling the tool. A further object is to prevent release of the magnet force until the electric power has been cut off.

A further feature is the provision of an interlock preventing closure of the motor switch unless the magnetic fields in the base are additive and the base is resting on a support surface to push the probe into the base.

This invention is described in connection with a hole cutting power tool claimed in Application Ser. No. 720,860. The quick change cutting tool disclosed herein is claimed in Ser. No. 720,859. The coolant dispensing mechanism is claimed is Ser. No. 720,861. The tool feed handle construction is claimed in Ser. No. 720,858.

DETAILED DESCRIPTION OF THE DRAWINGS

Figure 2:
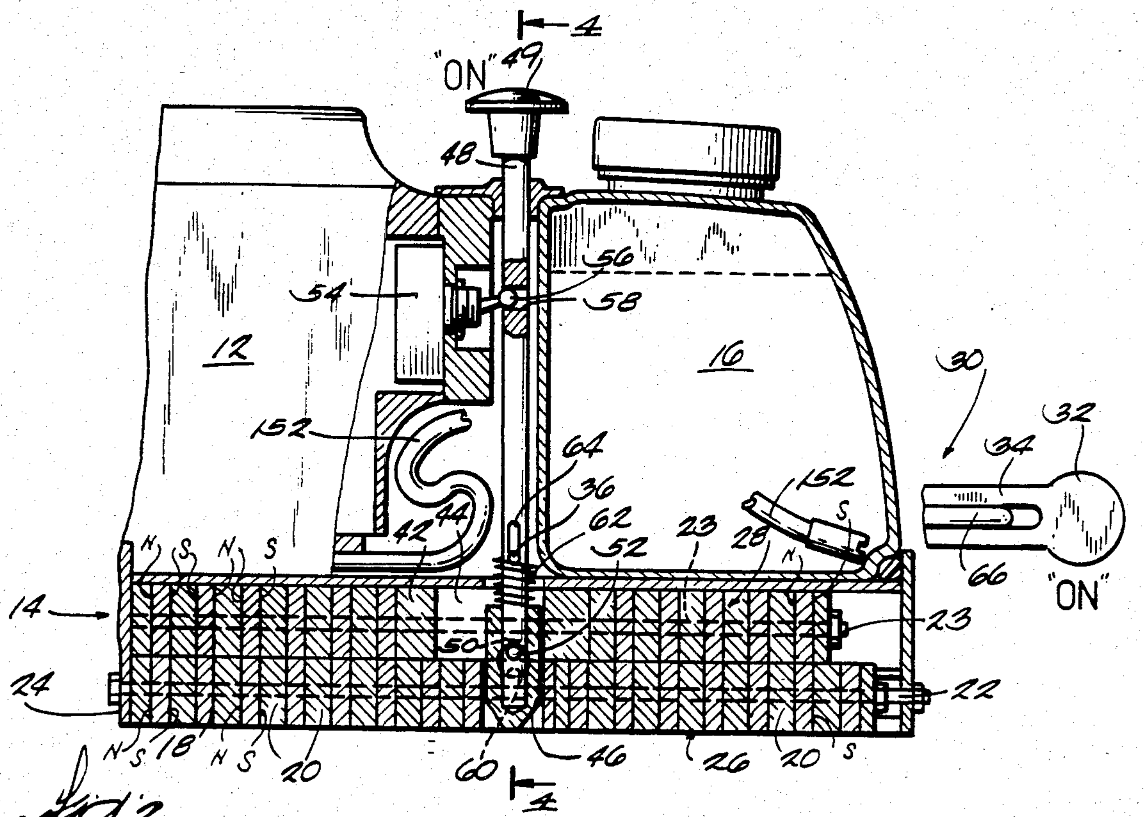
FIG. 2 is an enlarged detailed section showing the magnetic base structure with the magnetic fields reinforcing.
Figure 3:
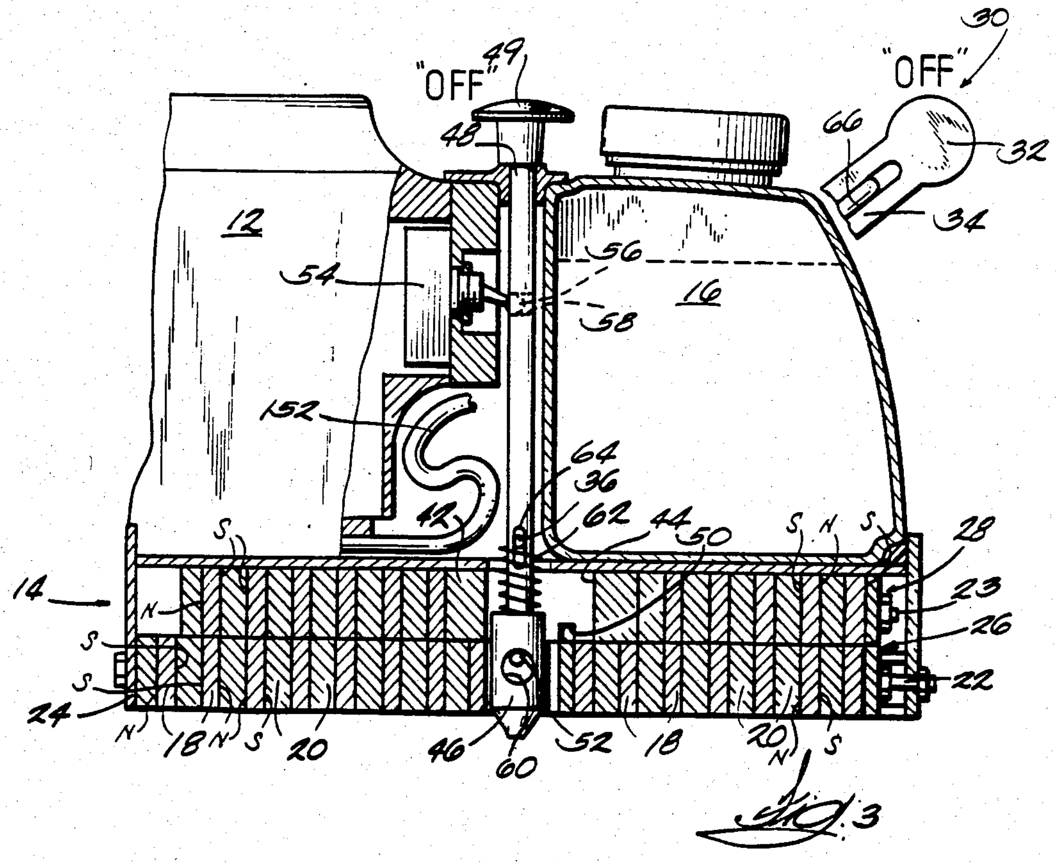
FIG. 3 is similar to FIG. 2 but the magnetic fields cancel in this view.
Figure 4:
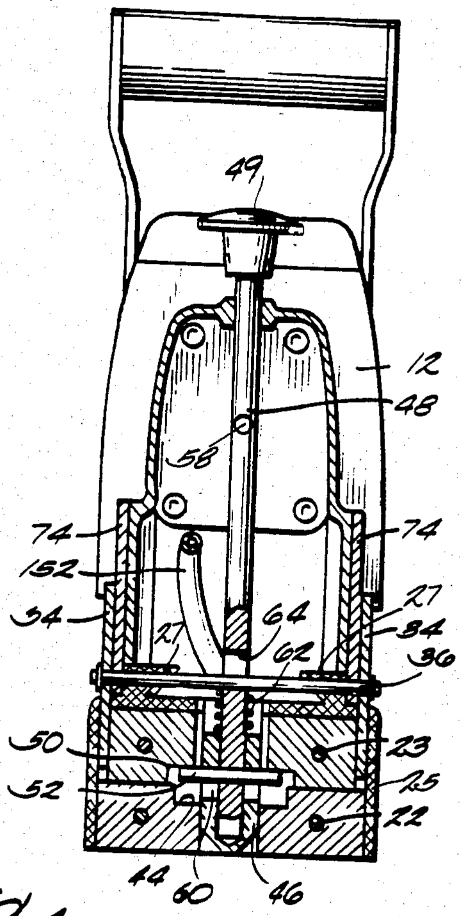
FIG. 4 is a vertical section through FIG. 2 along the switch rod.
Figure 5:
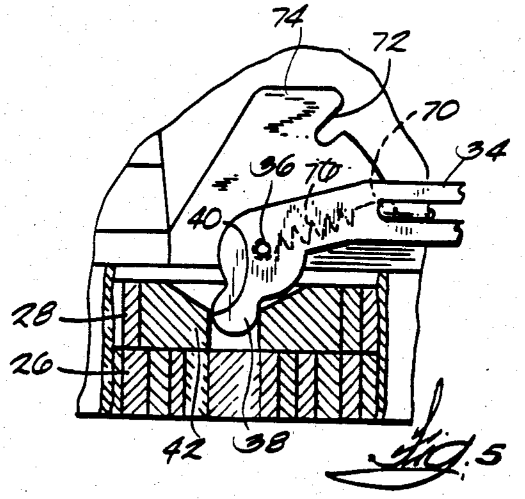
FIG. 5 is a detailed section showing how the lever/-handle actuates the upper magnet assembly.

The portable hole cutting tool 10 includes a motor housing 12 mounted on a magnetic base 14 with a coolant reservoir 16 secured to the base behind the housing 12. The magnetic base has two permanent magnet assemblies 26, 28 with one (28) mounted on top of and movable relative to the bottom assembly 26. As seen in cross section, the thin parts 18 are the permanent magnets while the thick plates 20 are the ferromagnetic material, i.e., steel. The magnets are magnetized so that confronting faces of the magnets have similar polarities as indicated in the drawings. The alternating magnets and steel pieces in the lower assembly 26 are tied together by tie rods 22 running the length of the assembly and through the ends 24 of the base 14. The upper assembly is tied by rods 23. The tie rods 22, 23 straddle the sensor structure 46 to be described. When the upper magnetic assembly 28 is positioned as shown in FIG. 2, the upper magnets are aligned with the lower magnets of similar polarity. Thus, the steel pieces between the upper and lower magnets are alternately North and South and this will set up a magnetic field attracting the base of the tool to a ferromagnetic material contacting the base. The upper magnetic assembly is slightly shorter than the lower magnet assembly so there is always some flux effective even when the upper magnetic assembly is shifted to the right by a distance adequate to align the upper magnets with lower magnets of opposite polarization as shown in FIG. 3 and the fields of the upper and lower assemblies substantially shunt each other leaving only a small net force holding the tool on the work surface. This is desireable because it improves the handling characteristics of the tool.

Shifting the upper magnetic assembly 28 relative to the lower assembly 26 is controlled by handle 30 which has a hand grip 32 at the distal end of the crank arms 34 straddling the reservoir 16 and pivoted on shaft 36 fixed in the rear of the housing. The short leg 38 of each crank 34 is received in a slot 40 of an aluminum (non-magnetic) actuating block 42. The actuating block has an elongated central opening 44 through which the sensing probe 46 and switch rod 48 extend. The elongated opening 44 permits the upper magnetic assembly 28 to shift relative to the lower magnetic assembly 26 and relative to the sensor 46 and rod 48.

The non-magnetic block 42 is provided with a transverse groove 50 on the underside permitting cross pin 52 mounted transversely in the switch rod 48 to come up into the groove 50 when the magnetic assembly is active (as shown in FIG. 2). If the upper magnetic assembly 28 has been shifted to the right (FIG. 3), the groove is shifted and cannot receive cross pin 52 and switch rod 48 cannot be raised to its upper position to close switch 54 which is a toggle switch having its actuating handle 56 received in hole 58 in the switch rod. Thus, it will be appreciated the upper magnetic assembly 28 must be in the active position (FIG. 2) to permit the switch 54 to be closed to turn on the motor in housing 12.

It will be noted the sensor 46 is reciprocally mounted on the lower end of the switch rod 48 with the cross pin or stop 52 extending through the hole 60 in the sensor. Thus, the sensor can move relative to the cross pin 52 within the limited range of movement permitted by the cross pin 52 engaging opening 60. The sensor is biased downwardly by spring 62 compressed between the upper end of the sensor 46 and the pin 36 extending through slot 64 in the switch rod 48. It will be appreciated that in the position shown in FIG. 2 the sensor has been pushed upwardly by reason of engagement with a flat surface. This enables the switch rod 48 to be raised, as illustrated, to close the switch 54. If the tool is knocked over or the like so the sensor is no longer pushed into the base by reason of contact with a work surface, the spring 62 will force the sensor downwardly out of the base and that will cause the aperture 60 to pull pin 52 down and pull the switch rod 48 down to actuate the bat switch handle 56 to turn off switch 54 and deenergize the motor.

Figure 1:
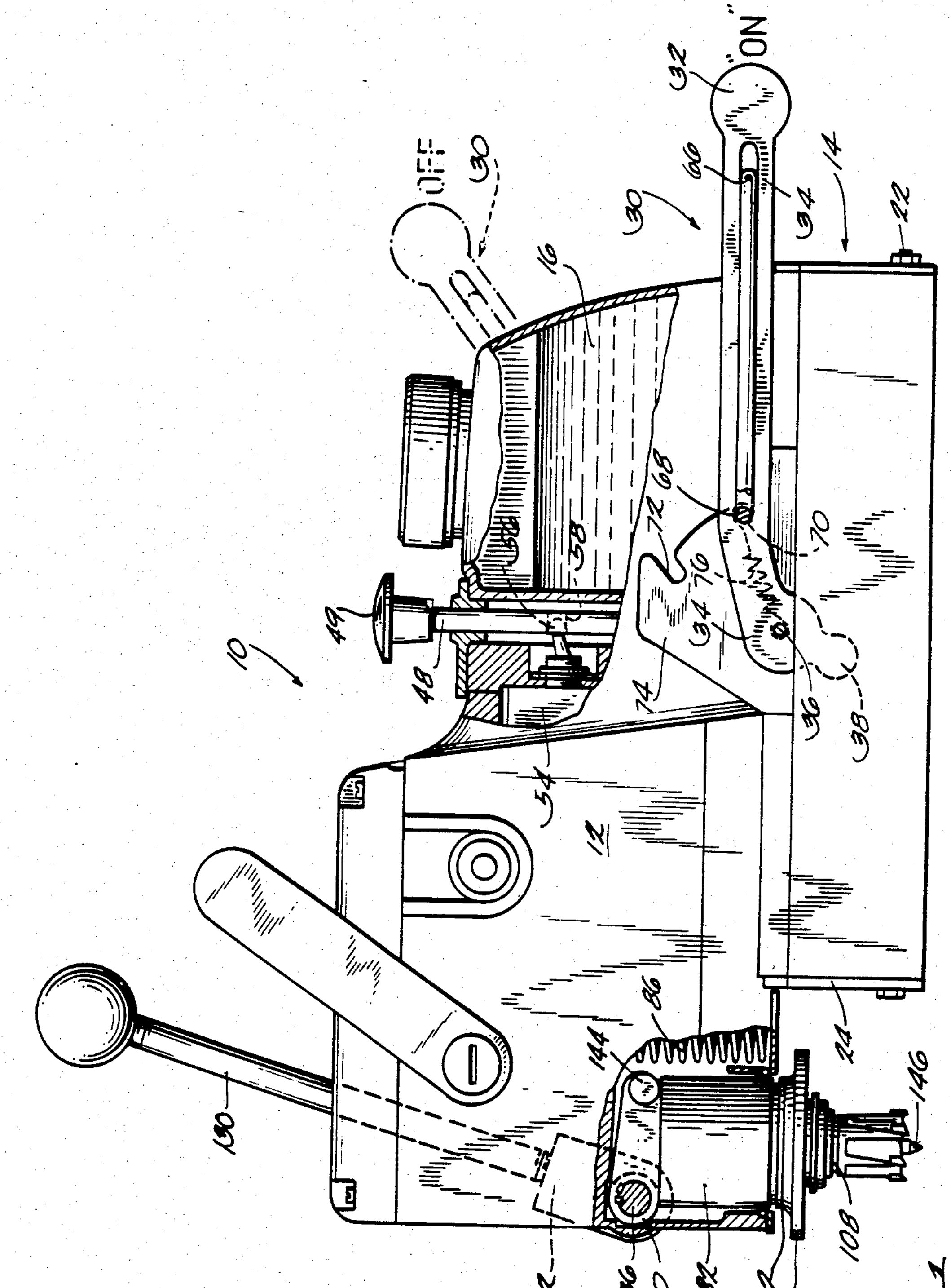
FIG. 1 is a side elevation with part of the housing and coolant reservoir broken away.

When the magnetic assembly is positioned as shown in FIG. 2 and the sensor is retracted, the motor can be energized by lifting the knob 49 on the switch rod 48. The knob 49 is depressed to turn the motor off. The upper magnetic assembly is actuated by actuating lever 30. The lever is locked in either the magnet energized (FIG. 2) or the magnet deenergized position (FIG. 3) by a latch arrangement which includes the U-shaped latch member 66. The cross leg of the U extends through the slots in the crank arms 34 and the open ends are turned in at 68 to engage either the "on" slot 70 on the "off" slot 72 in the side plate 74 (FIG. 1). The in-turned ends 68 are biased into engagement with either of the slots by a tension spring 76. When it is desired to go from the "on" to "off" or from "off" to "on" mode, the cross piece 66 of the latch is pulled rearwardly to disengage the ends 68 from the slot and permit the lever to be actuated. When the cross piece 66 is released, spring 76 will pull the latch ends 68 back into the appropriate slot.

The motor in housing 12 drives spindle 78 (FIG. 8) on which a hole cutting tool 108 is mounted. Details of the drive, chuck etc. can be seen in Application Ser. No. 720,860. The cutting tool is fed into the material to be cut by actuating handle 130. A center indicator 146 acts as a slug ejector as the cutter is retracted from the work.

As noted above the upper assembly shunts the field of the lower assembly when the assemblies are positioned as in FIG. 3. Since there are more magnets in the lower assembly there is still a magnetic field effective to hold the power tool on a ferromagnetic material, albeit with greatly reduced force. This helps in positioning the tool and holding the position while the handle 30 is actuated to make the fields additive.

I claim:

1. An electric power tool having a base, permanent magnet means in said base for holding said base to a ferromagnetic material, means operative to substantially shunt the magnetic field of said permanent magnet means to permit removal of the tool from the material, a handle including lever means movable between "on" and "off" positions and connected to said shunt means to cause said shunt means to become operative when the lever means is moved to said "off" position, a probe mounted in said base for reciprocation between a retracted position and a second position in which it projects from said base, a spring biasing said probe to its said second position, and means interconnecting said probe and said shunt means to prevent movement of said shunt means when said probe is in said second position.

2. An electric power tool according to claim 1 in which said shunt means is a permanent magnet structure movable relative to said base between a position in which the field of said structure opposes or shunts the field of said permanent magnet means in said base and another position in which the field of said permanent magnet structure adds to the field of said permanent magnet means in said base.

3. An electric power tool according to claim 2 in which the permanent magnet means in said base and in said shunt means comprises a series of alternate permanent magnet plates and ferromagnetic plates, said shunt means being movable relative to said base a distance equal to the thickness of a permanent magnet plate plus the thickness of a ferromagnetic plate whereby the magnetic field of said shunt means can be moved to enhance or oppose the field of said base, and means preventing operation of said power tool when said shunt means is positioned to oppose the field of said base.

4. An electric power tool having a frame, an electric motor mounted on said frame, a switch controlling operation of said motor and movable between "on" and "off" positions, an actuator for operating said switch, a permanent magnet base for said frame including first and second magnet assemblies, said first magnet assembly including a multiplicity of vertically disposed alternate and ferromagnetic plates and permanent magnets magnetized across their thickness with the polarity of confronting faces of the magnets being the same so the ferromagnetic plate between said confronting faces has the same polarity and a magnetic field is established with alternate polarity in alternate ferromagnetic plates a second magnet assembly slidably mounted in said frame on top of said first magnet assembly and having alternate magnets and ferromagnetic plates arranged and polarized similarly to the first assembly, means for moving said second assembly between an "off" position in which the field of the second assembly shunts the field of the first assembly and an "on" position in which the field of the second assembly adds to the field of the first assembly, means responsive to the position of said second assembly preventing operation of said switch actuator to move said switch to its "on" position when said second assembly is in its said "off" position, and probe means connected to said switch actuator and operative to move said actuator to move said switch to its "off" position when said base is not resting on a flat surface.

5. A power tool according to claim 4 in which said switch actuator is a rod vertically reciprocable in said frame, means biasing said probe means to project from said base.

6. An electric power tool having a frame, an electric motor mounted on said frame, a switch controlling operation of said motor and movable between "on" and "off" positions, an actuator for operating said switch, a permanent magnet base for said frame including first and second magnet assemblies, said first magnet assembly including a multiplicity of vertically disposed alternate and ferromagnetic plates and permanent magnets magnetized across their thickness with the polarity of confronting faces of the magnets being the same so the ferromagnetic plates between said confronting faces has the same polarity and a magnetic field is established with alternate polarity in alternate ferromagnetic plates, a second magnet assembly slidably mounted in said frame on top of said first magnet assembly and having alternate magnets and ferromagnetic plates arranged and polarized similarly to the first assembly, means for moving said second assembly between an "off", position in which the field of the second assembly shunts the field of the first assembly and an "on" position in which the field of the second assembly adds to the field of the first assembly, means responsive to the position of said second assembly preventing operation of said switch actuator to move said switch to its "on" position when said second assembly is in its said "off" position, probe means connected to said switch actuator and operative to move said actuator to move said switch to its "off" position when said base is not resting on a flat surface, said switch actuator being a rod vertically reciprocable in said frame, means biasing said probe means to project from said base, said means preventing operation of said switch actuator comprising, a member projecting from said rod to engage said second magnet assembly when said second magnet assembly is in its "off" position, and a recess in said second magnet assembly positioned to receive said projecting member when said second magnet assembly is in its "on" position thereby enabling said rod to move to actuate said switch.

7. An electric power tool having a frame, an electric motor mounted on said frame, a switch controlling operation of said motor and movable between "on" and "off" positions, an actuator for operating said switch, a permanent magnet base for said frame including first and second magnet assemblies, said first magnet assembly including a multiplicity of vertically disposed alternate ferromagnetic plates and permanent magnets magnetized across their thickness with the polarity of confronting faces of the magnets being the same so the ferromagnetic plates between said confronting faces has the same polarity and a magnetic field is established with alternate polarity in alternate ferromagnetic plates, a second magnet assembly slidably mounted in said frame on top of said first magnet assembly and having alternate magnets and ferromagnetic plates arranged and polarized similarly to the first assembly but having fewer magnets than does the first magnet assembly, means for moving said second assembly between an "on" position in which the field of the second assembly adds to the field of the first assembly and an "off" position in which the field of the second assembly shunts the field of the first assembly whereby the magnetic force of the permanent magnet base is that attributable to the excess magnets in said first assembly over the magnets in said second assembly, means preventing movement of said second assembly to its said "on" position unless said base is in engagement with a surface, means preventing actuating said switch to its said "on" position unless said second assembly is in its said "on" position, and means actuating said switch to its said "off" position in response to movement of said base out of engagement with said surface.

8. An electric power tool having a base permanent magnet means in said base for holding said base to a ferromagnetic material, magnetic means movable between active and shunt positions and operative in said active position to add to the field of said magnet means in said base and operative in said shunt position to substantially shunt the magnetic field of said permanent magnet means in said base to permit removal of the tool from the material, a handle including lever means movable between "on" and "off" positions and connected to said magnetic means to move said magnetic means between its said active and shunt positions respectively, a probe mounted in said base for reciprocation between a retracted position and a second position in which it projects from said base, a spring biasing said probe to its said second position, and means interconnecting said probe and said lever means to prevent movement of said magnetic means to said active when said probe is in said second position.

* * * * *